United States Patent [19]

Zheng

[11] Patent Number: 5,772,327

[45] Date of Patent: Jun. 30, 1998

[54] AUTOMATIC FUSION-TEMPERATURE CONTROL FOR OPTICAL FIBER SPLICERS

[75] Inventor: Wenxin Zheng, Solna, Sweden

[73] Assignee: Telefonaktiebolaget LM Ericsson, Stockholm, Sweden

[21] Appl. No.: 638,147

[22] Filed: Apr. 26, 1996

[30] Foreign Application Priority Data

Apr. 28, 1995 [SE] Sweden .................................. 9501589

[51] Int. Cl.$^6$ .................................................. G01K 11/06
[52] U.S. Cl. .................... 374/160; 374/187; 374/188
[58] Field of Search ............................... 374/160, 187, 374/188, 55

[56] References Cited

U.S. PATENT DOCUMENTS

| | | |
|---|---|---|
| 4,557,556 | 12/1985 | Decker, Jr. . |
| 5,490,475 | 2/1996 | Bryant et al. .................. 116/217 |
| 5,572,313 | 11/1996 | Zheng et al. . |
| 5,586,211 | 12/1996 | Dumitrou et al. .................. 385/135 |

*Primary Examiner*—George M. Dombroske
*Assistant Examiner*—Joseph L. Felber
*Attorney, Agent, or Firm*—Burns, Doane, Swecker & Mathis, L.L.P.

[57] ABSTRACT

For measuring and controlling the temperature of a splice portion between two optical fiber (1, 1') ends, during the splicing process when the material of the ends is heated to be fusioned, the time-dependency of the surface tension effect for viscous liquids is utilized. Then the fiber (1, 1') ends are placed for splicing with a relatively large lateral offset in the retainers (39) of a fiber splicer and are spliced by the heat of an electric arc generated between the welding electrodes (43). The heating of the fiber ends is continued, whereby the offset of the fiber ends will gradually decrease due to the surface tension. The offset is then measured at different times during the continued heating and from these determined values and the times when they were measured the temperature of the heated fiber end portions is determined. This temperature value may then be compared to a predetermined set value for control of the heating of the splice region. Hereby also offset attenuators can be made having relatively accurate, predetermined attenuation values.

4 Claims, 5 Drawing Sheets

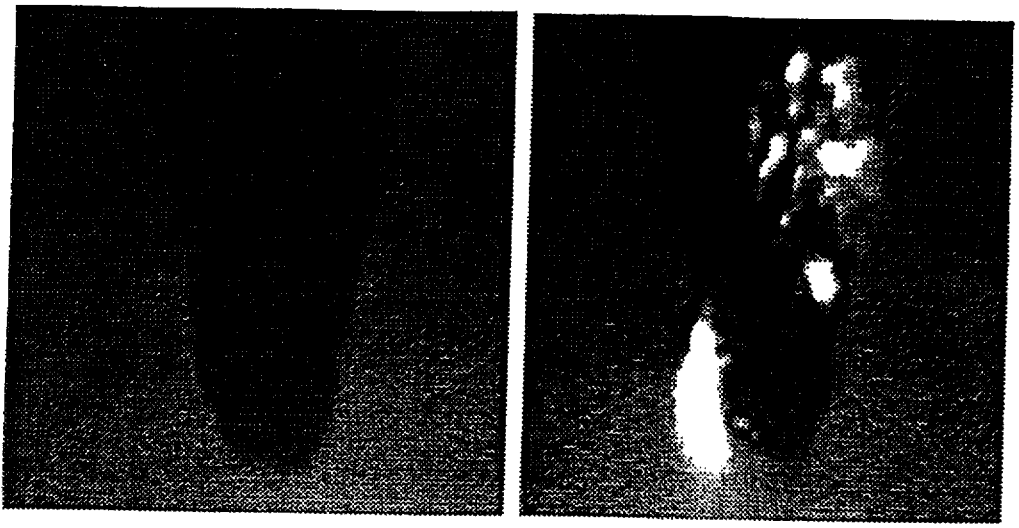
Fig. 1a
(Prior Art)
Fig. 1b
(Prior Art)
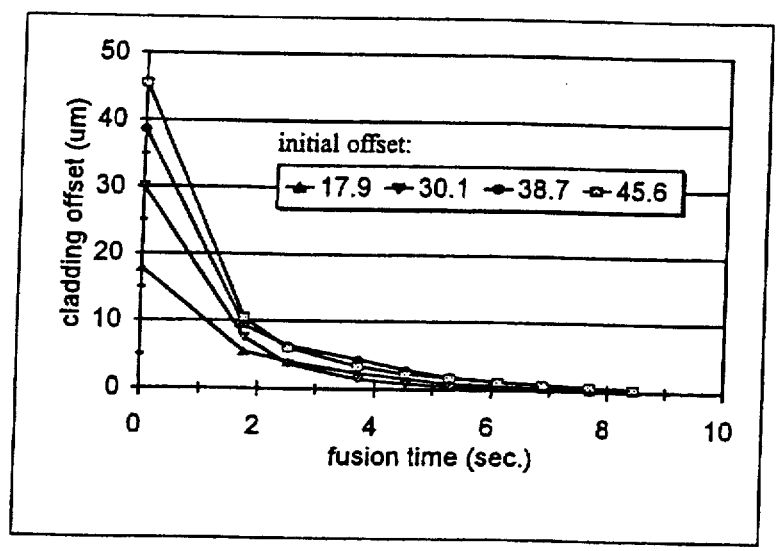
Fig. 2
(Prior Art)

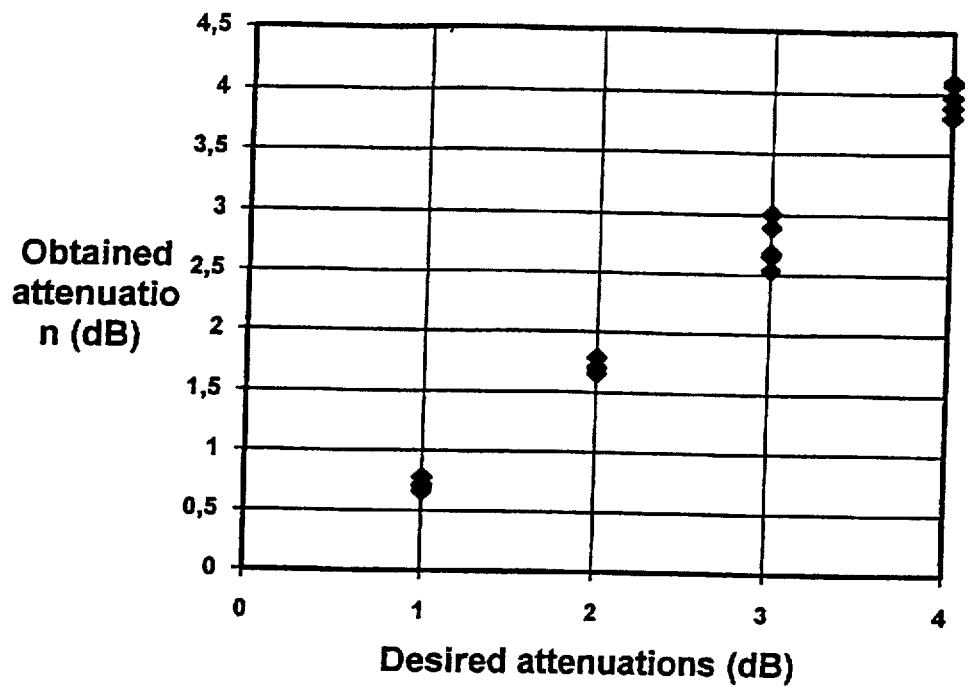
Fig. 5
Fig. 6
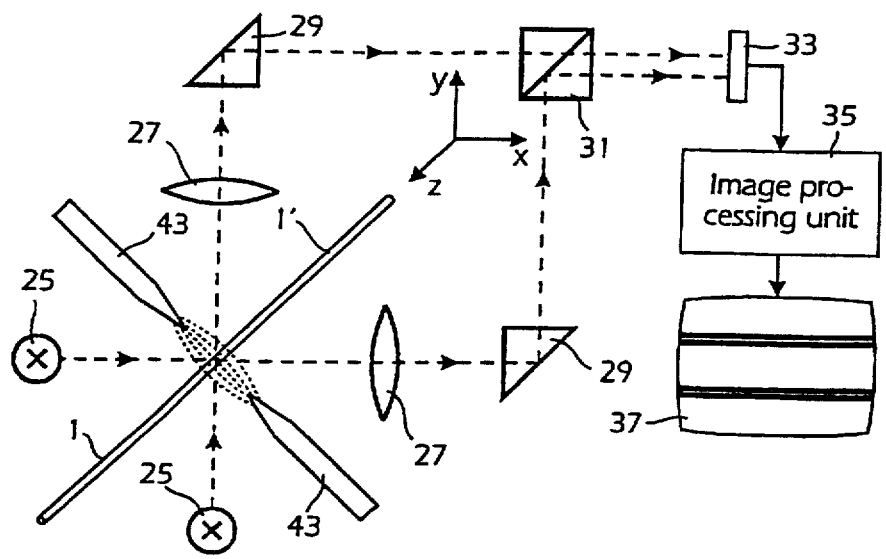

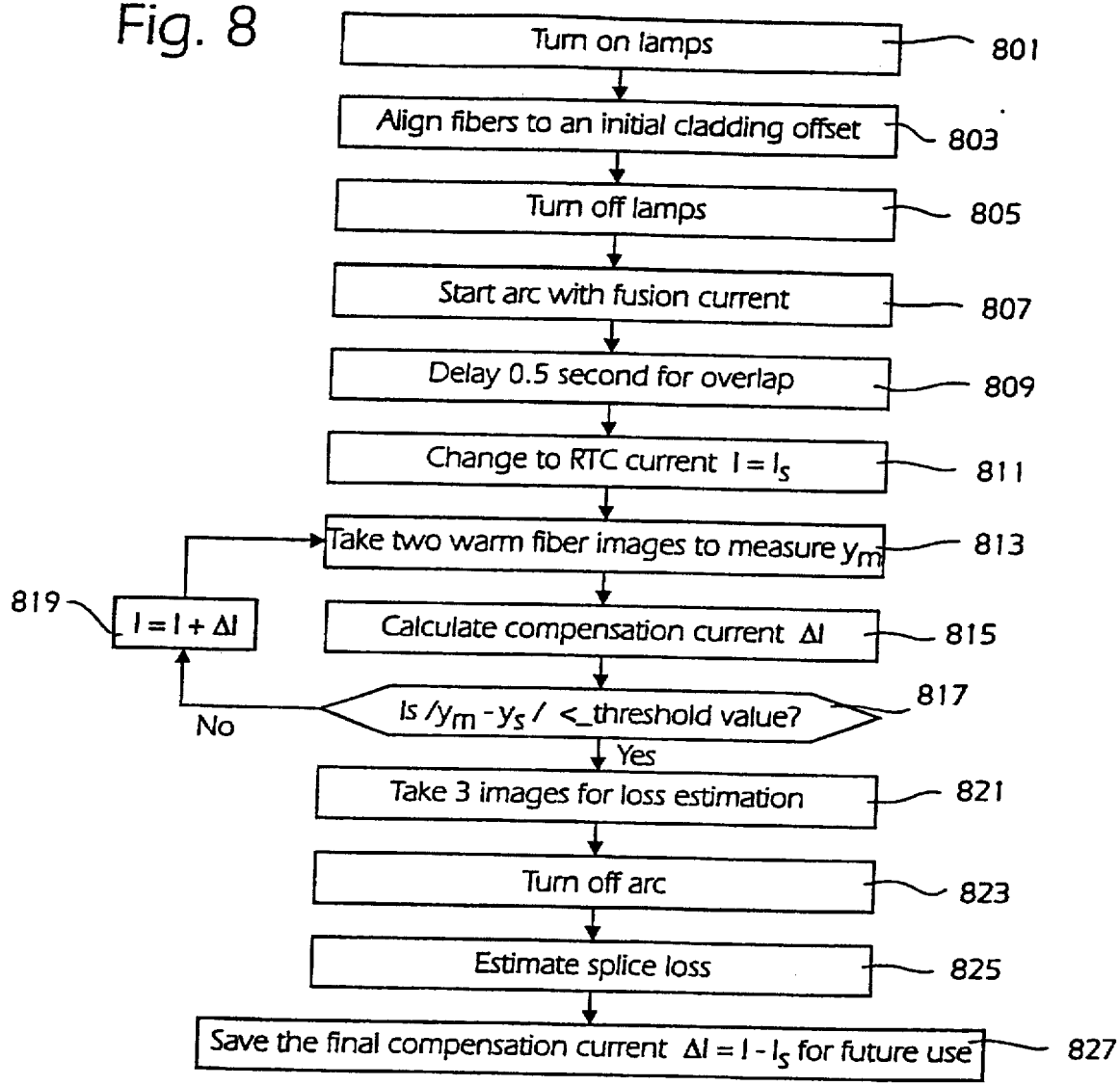

AUTOMATIC FUSION-TEMPERATURE CONTROL FOR OPTICAL FIBER SPLICERS

TECHNICAL FIELD

This invention is related to a method for measuring temperature, in particular for automatic fusion-temperature control for optical fiber splicers, and to a device carrying out the method, in particular a modified optical fiber splicer.

BACKGROUND

In optical fiber fusion splicers, an electrical arc is often used to melt two fiber ends to splice the two ends together. The arc is generated between a pair of electrodes to which a very high voltage of DC or AC electric current is applied. The strength of the arc is normally controlled by a feedback control of the current or/and power consumption (multiplication of current and voltage), see e.g. the published International patent application WO-A1 95/24664 "Electronic control for welding optical fibers", filed Mar. 7, 1995 corresponding to the Japanese patent application 523, 999/95 and U.S. patent application Ser. No. 08/400,966. However, in practical use of that method the temperature of objects heated by the arc will vary from splicer to splicer and from time to time, since the condition of the electrode pair is always changing, causing a varying strength of the arc.

During high temperature fusion splicing (the temperature of the material of the fiber ends is about 1,800° C.–2,000° C. and the temperature in the arc region surrounding the fiber ends is about 3,000° C.–4,000° C.), particles from the silica material of the fibers are evaporated and plated on the surface of the electrodes, giving the surface a rather rough structure, see the photograph of a tip of an electrode in FIG. 1a. The thickness and the shape of the silica plating are permanently changing a little, since part of the plated particles will be burnt away while new particles are disposed on the electrode surfaces. The silica layers have a conductivity which is very different from that of air for the high temperature and high voltage used. It makes the strength and shape of the arc non-uniformly distributed and continuously changing, see the photograph of the tip in FIG. 1b. Thus, even if the current can be very well regulated by the electronic controller of the splicer in order to be maintained at the same value, the temperature of the fiber ends will still vary from splice to splice made. However, the effect of the moderate temperature variation is not so significant for ordinary splices performed where an alignment of the outer surfaces of the claddings is made. But, if some special splices are considered, such as splices having a desired attenuation, the variation could be critical.

Moreover, the temperature of the arc is also strongly dependent upon the barometric pressure of the surrounding air. The peak temperature of the arc changes tremendously at different altitudes for the same splice current. Without performing a re-optimization of the fusion current in some geographic districts located at a high altitude, the fibers cannot be spliced to each other at all.

The temperature of the arc can for instance significantly influence the manufacture of fused attenuators by offset splicing, as described in the published International patent application WO-A1 95/24665 "Controlled splicing of optical fibers" corresponding to the Japanese patent application 523,400/95 and U.S. Pat. No. 5,638,476, which is incorporated by reference herein. Here the ends of optical fibers are displaced in a lateral direction, an offset existing then between the sides of the fibers, thus between the outer surfaces of the fiber claddings. Also, in the manufacture of attenuators where a diffusion of the core material in an optical fiber is used, see our simultaneously filed patent application "Optical fiber attenuator", the temperature of the arc has to be carefully regulated during an extended time period.

SUMMARY

It is an object of the invention to provide a method for measuring temperature which can be used as part of an automatic method for regulation of the fusion temperature when welding optical fibers and which can performed in real time.

It is another object of the invention to provide a method for producing optical fiber attenuators of the offset type having a good temperature control which can be executed in conventional automatic fiber splicers by modifying their control procedure.

It is another object of the invention to provide devices for measuring temperature, in particular a splicer apparatus for optical fibers having a good temperature control, also suited for producing attenuators of the offset fiber splice kind.

These objects are achieved by the invention, the features and characteristics of which appear from the appended claims.

Thus generally, the temperature of a heated region or the temperature of a piece of material placed inside the heated region can be determined in the following way. First some suitable piece of material is chosen, which has a melt temperature adapted to the temperature of the heated region. Thus it should be melted or generally given a preferably viscous or at least liquid state when it is introduced in the heated region and has been heated by the heat therein. The material and the shape of the piece should have the characteristics that it will be subjected to non-uniform and/or localized forces generated by the surface tension in the liquid state. In particular the configuration or shape of the piece of material should be such that it will be deformed in the liquid state due to the surface tension forces. The preferred material comprises glass materials, in particular the silica glass of optical fibers. The preferred shape or configuration of the piece is that it comprises the abutting end portions of two optical fibers, the end portions being located in parallel to each other but not aligned, so that there is an offset of the surfaces of the optical fibers, that is of the surface of the fiber claddings.

The piece of material is inserted in the heated region, in the preferred case thus the fiber ends portions are inserted therein, the heated region being preferably the electrical arc region generated between the electrode tips of a conventional fiber splicing apparatus. The velocity of the deformation of the piece is then determined by e.g. observing the geometrical change of the surface of the piece of material. In the special case the offset of the fiber ends may be measured, either as the offset of the fiber claddings or preferably, as the offset of the fiber end cores, this measurement being made at least twice. It may be possible in some cases to use as one measurement the initial lateral offset when the fiber ends portions are entered in the heated region. From the determined velocity of deformation the temperature of the piece of material and then of the heated region are finally determined.

In the special case the temperature of the heated region may be sufficient to melt-fusion the fiber end surfaces to each other but preferably the fiber ends are then first heated to a somewhat higher temperature than that of the heated region for accomplishing the melt fusioning. This is easily achieved in the case where the heated region is the region of an electric arc, by first raising the electric current or power of the arc and then lowering it slightly to a constant value where the fiber end offset is observed.

In the special case the steps discussed above can be used for controlling the temperature of a splice portion between two optical fiber ends, during the splicing process when the ends are heated to a melting or near melting temperature, and also for making a fiber splice having a predetermined offset to be used an optical attenuator, this process generally requiring an accurate temperature control. The control is made in the conventional manner where the determined temperature is first compared to a predetermined set value, and then the heating of the fiber end portions is changed in accordance with the result of the comparison, by changing the electrical current between the electrodes.

A temperature measurement device will then comprise a piece of material chosen as described above and measurement means for measuring some characteristic of the geometrical shape of the piece of material which changes when the piece is deformed by the heat. Further, it must comprise means for determining the velocity of the deformation from the measurement of the measuring means, and finally means for determining from the determined velocity of deformation the temperature of the piece of material and thence of the heated region.

In the special case the device comprises retaining and positioning means, such as the conventional chucks or clamps in a fiber splicing apparatus, for retaining the fibers and positioning the two end portions. These means can contain or cooperate with image processing and control means for placing the fiber ends with their end surfaces adjacent to or abutting each other and with the initial lateral offset, and also for placing the abutting end surfaces inside the heated region. The measuring means, preferably comprised in image processing means of a fiber splicer and commanded by control means therein, are arranged to determine values of the lateral offset of the fiber ends at at least two different times when the fiber end portions are located in the heated region. Then the velocity determining means can calculate from these determined offset values and the length of the time period or periods between the measurements thereof the temperature of the end portions. This device can then be used for producing offset splices having a predetermined attenuation by the accurate temperature control.

BRIEF DESCRIPTION OF THE DRAWINGS

The invention will now be described as a non-limiting exemplary embodiment with reference to the accompanying drawings in which FIG. 1a is a photograph of an electrode tip used for about 500 splices before an arc discharge, FIG. 1b is a photograph of the electrode tip of FIG. 1a during an arc discharge, FIG. 2 is a diagram of the cladding offset measured in real time as a function of time during the splicing with a fusion or arc current of 13.0 mA for different initial offset values, FIG. 5 is a diagram of the measured attenuation for 20 deformed and diffused attenuators with "AT&T DSF" fibers on both sides of the splice, FIG. 6 is a schematic picture of the light paths in an automatic fiber splicing apparatus.

FIG. 8 is a flow diagram illustrating a real time fusion current control procedure,

DETAILED DESCRIPTION

Figure 3:
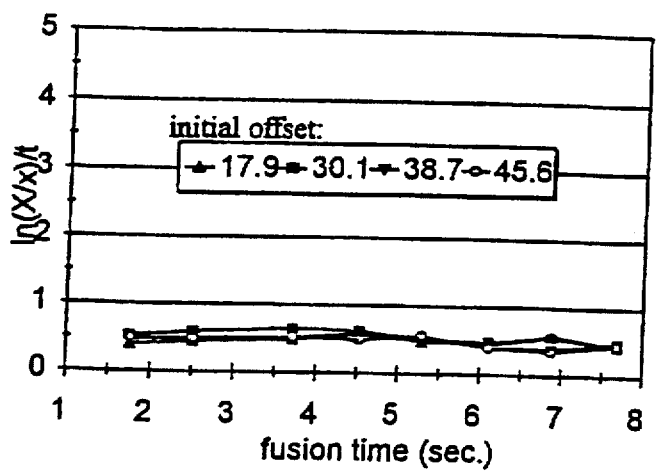
FIG. 3 is a diagram of the constant K1 as a function of time as calculated from the corresponding curves of FIG. 2.

When we are trying to make a splice of two optical fiber ends, the ends being positioned with an initial cladding offset, the surface-tension effect will tend to eliminate any cladding offset when the ends are heated and melted together. The pull-back distance, x, can be approximately expressed as an exponential function of time, see the article "Fusion splices for single-mode optical fibers", I. Hatakeyama and H. Tsuchiya, IEEE Journal of Quantum Electronics, Vol. 14, No. 8, pp. 614–619, August 1978, $$x = X \cdot \exp\left(-\frac{2\tau}{Rv} t\right) \quad (1)$$

where X is the initial cladding offset at the time t=0, $\tau$ and $v$ are the surface tension and viscosity of melted silica, and R is the cladding radius, respectively. With an automatic splicer equipped with an image processing system, the parameters x, X, R, and t are all measurable from the images recorded by the camera of the system, and this measuring or evaluation procedure can be performed automatically by an appropriate programming of the image processing system. Assuming that the surface tension $\tau$ and viscosity $v$ are not dependent on the cladding offset values x and X, then the ratio X/x should be only proportional to the time for the known fiber radius:

$$\ln(X/x) = K_1 t \quad (2)$$

Assuming that both the surface tension and viscosity can be approximated by linear functions of the temperature T of the fiber ends in a rather small temperature interval, such as the interval 1,800° C.–2,000° C. which is valid for the melted regions of the fiber ends, we have $$K_1 = \frac{2\tau}{Rv} = K_2 T \quad (3)$$

Thus, the variation of temperature from $T_1$ to $T_2$ can be measured from the variation of the ratio $X_1/x_1$ and $X_2/x_2$:

$$\frac{T_1}{T_2} = \frac{t_2 \cdot \ln(X_1/x_1)}{t_1 \cdot \ln(X_2/x_2)} \quad (4)$$

where $t_i$ is the length of the time period to arrive to the offset $x_i$ from the original offset $X_i$, for i=1, 2. For the same time period t, that is if $t_1=t_2$, the relative change of the fiber temperatures can be calculated by the measurement of the initial and final offsets.

The result of Eq. (4) can be directly used for temperature control when heating an offset fiber joint during an extended time, in order to keep the temperature constant during the heating period. Then the offsets $X_1$, $x_1$ are determined at two successive times and then offsets $X_2$, $x_2$ at two other following times, where the times $t_1$ and $t_2$ may be the same time. The ratio as calculated by Eq. (4) should then be equal to 1 for a constant temperature. If it is not, the temperature has changed and then the heating power or intensity must be changed, e.g. by changing the electrical an electric arc used for splicing the fiber ends. After the change new offset values $X_2$, $x_2$ are measured at two new times and the ratio of Eq. (4) is again calculated and compared to the value 1.

If we assume that the temperature T is proportional to the power consumption, see D. Tillberg, "Plasmasvetsning av optiska fibrer" (Plasma Welding of Optical Fibers), Ericsson Technical report, N/ST 93:545, Sep. 1993, it is obtained $$T \propto V \cdot I = KI^2 \cdot p/n_e \qquad (5)$$

where V is the voltage applied to the electrode pair, I is the fusion current, p is the air pressure, $n_e$, is the electron density in the arc, and K is a constant. By defining a quantity y $$y = \sqrt{K_1} = \sqrt{\ln(X/x)/t} \qquad (6)$$

we should have a linear relation between the current I and y $$y = c_1 I + c_2 \qquad (7)$$

where $c_1$ and $c_2$ are supposed to be constants for the same condition of the electrodes and the same air pressure.

In the derivation above, three assumptions have been used to obtain equations (2), (3), and (5). In order to check if they are true and to verify the validity of Eq. (7), a lot of offset fusion tests were made.

In the first assumption, the factor $K_1$ (i.e. essentially the surface tension and the viscosity) is supposed to be independent of the cladding offset x and the time t. This means that the ratio $\ln(X/x)/t$ should be a constant for varying fusion conditions, no matter what is the initial offset X. To prove this assumption, 5 splices of ordinary single-mode optical fibers were made for each of 4 different initial offset values X with a fusion current of 13 mA. The cladding offsets were measured in real time during the fusion process, see the prior International patent application cited above and FIG. 2, with clean electrodes and a constant, stable air pressure. The corresponding ratio, $\ln(X/x)/t$, was calculated and is plotted in FIG. 3. From FIG. 3, it is obvious that the first assumption is correct. The factor $K_1$ is a constant during the splicing except some small noise disturbance. Similar results are obtained with other fusion currents giving different values of the constant $K_1$. If higher currents are used, the cladding offset approaches zero very soon, which results in large errors in the calculation of the ratio $\ln(X/x)/t$.

The second assumption, $2/Rv = K_2 T$, and the third assumption, $T \propto V \cdot I$, can be tested at the same time by checking if the linear relation of Eq. (7) is true. For checking this, 40 offset splices for an initial cladding offset of 32 micrometers were made with clean electrodes and a constant air pressure. The results are plotted in the diagram of FIG. 4. Each dot in the figure corresponds to the average of 5 measured values. The solid line is the linear regression line. The correlation between the measured dots and the regression line is 0.972. It was thus found that the linear relation is true in the range of normal splicing currents. Since y can never be negative, this linear relation is valid only when the current is higher than 10.63 mA.

Figure 4:
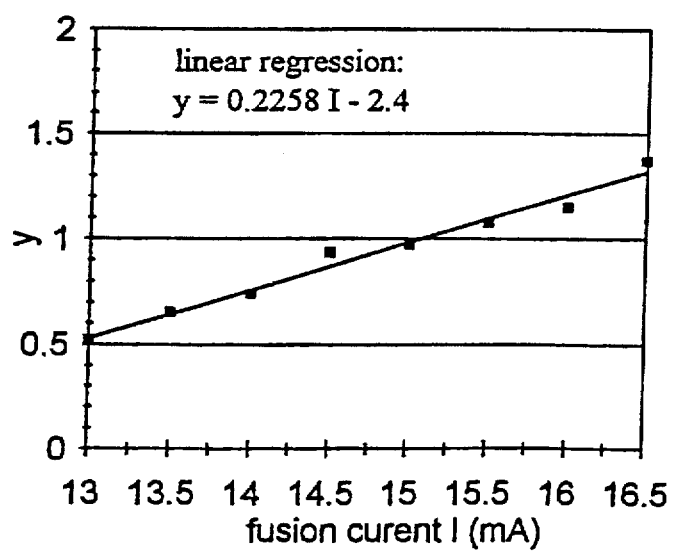
FIG. 4 is a diagram of a quantity y used in a temperature determination as a function of the fusion current.

Practically, since the electrode condition often varies from splice to splice and the air pressure varies from place to place, the selected current $I_s$ and the measured y will in general deviate from the regression line of FIG. 4, and sometimes the deviation is very large. From Eq. (4) we observe that the same fiber-end temperature always results in the same y value. In order to get a desired fiber-end temperature, we can try to obtain the same y by adjusting the current to a new value I according to Eq. (7):

$$I = I_s + \Delta I = I_s + (y_s - y_m)/c_1 = I_s + (c_1 I_s + c_2 - y_m)/c_1 \qquad (8)$$

where $I_s$ is the set fusion current, $\Delta I$ is the compensation current, $y_m$ is the y value measured in real time for an offset splicing, and $y_s$ is the value calculated from $I_s$, i.e. $y_s = c_1 I_s + c_2$. This real time temperature control procedure will be described hereinafter with reference to the flow diagram of FIG. 8. This procedure can be used for each splice for making an attenuator, or can be run as a special current-test program making an offset fiber joint of the selected kind of the fibers which are intended to be used, to select a correct current under different situations for ordinary splices.

Experimental Results

The current-control procedure has been used for making fused deformed and diffused optical fiber attenuators, see our simultaneous patent application "Optical fiber attenuator" cited above. This type of attenuators needs a very large initial cladding offset (up to 50 micrometers) and a prolonged after-heating time (about 20 seconds). Thus, there are enough time to run the current-control procedure for each splice in order to get the same amount of diffusion. By using the current-control procedure, a very small deviation in the attenuation in the produced attenuators is achieved as shown by the diagram of FIG. 5 where the measured attenuations for 20 deformed and diffused attenuators with "AT&T DSF" fibers on both sides of the splice have been plotted as a function of the desired attenuation values.

Figure 7:
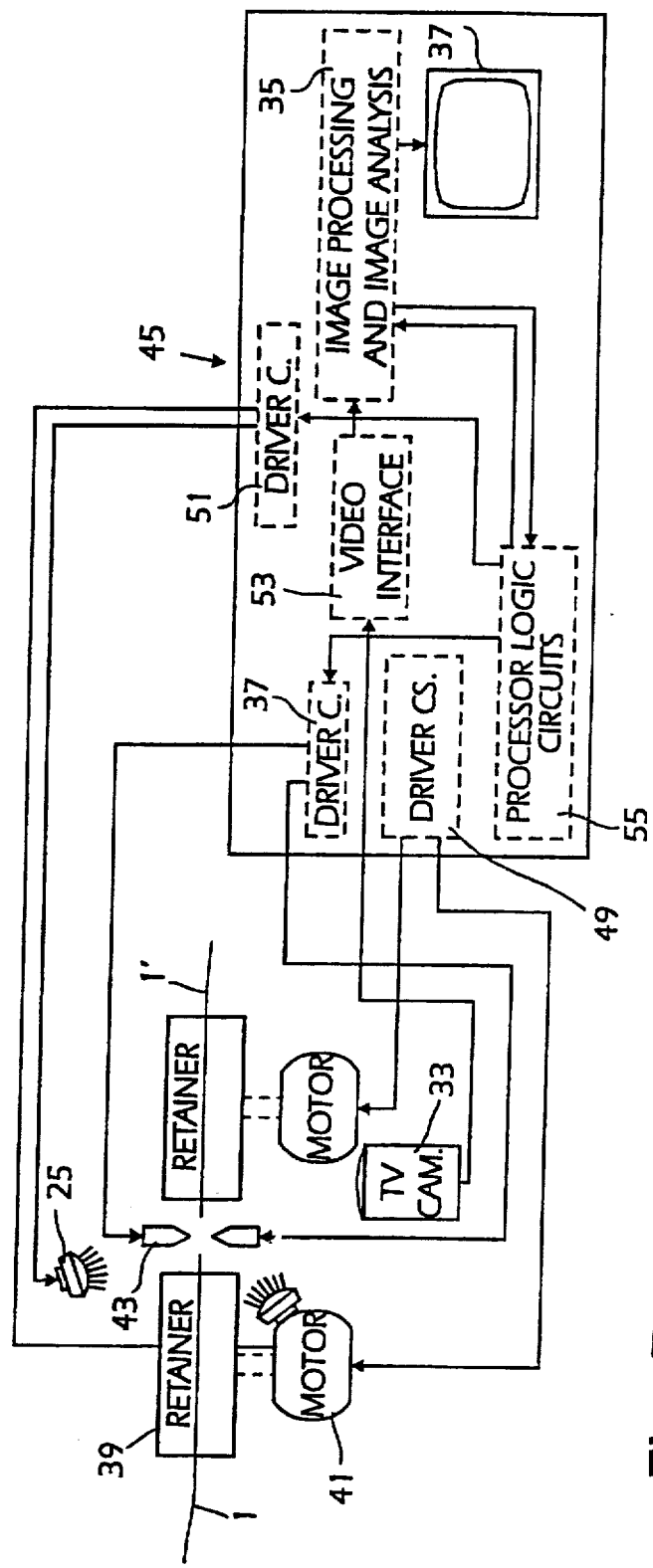
FIG. 7 is a schematic diagram of the mechanical and electronic components of an automatic fiber splicing apparatus.

The method described above is advantageously performed by an automatic image processing and positioning device used for splicing optical fibers, the optical components of which are schematically illustrated in FIG. 6 and the mechanical and electronic components of which are illustrated in FIG. 7.

In the optical system which is schematically illustrated in FIG. 6 two light sources 25 are arranged which illuminate the splicing position between the two fibers 1 and 1' in two directions perpendicular to each other and also perpendicularly to the longitudinal direction of the fiber ends. The light from the light sources 25 is focused or parallelized by means of lenses 27, after which the light rays are deflected perpendicularly by reflecting elements 29 and are caused to hit a beam splitter 31 which in this case is used invertedly in order to collect the two light beams obtained from the perpendicular directions to the same TV camera or CCD-camera 33 comprising an area or surface having light sensitive elements. From the TV-camera 33 the generated video signal is delivered to an image processing unit 35, by means of which the pictures can be shown on a monitor or display element 37. A picture will then show the splicing position between the fiber ends as viewed in the two perpendicular directions and positioned above each other.

In the schematic picture of FIG. 7 a fiber splicing device of the automatic type is shown having retainers 39, in which the fiber ends are placed and are retained during the positioning and the splicing. The retainers 39 are movable in three orthogonal coordinate directions both in parallel to the longitudinal direction of the fibers and in two directions perpendicular to this direction which then also are perpendicular to the illuminating direction from the light sources 25. The retainers 39 are thus operated along suitable mechanical guides, not shown, by control motors 41. Electric conducting lines to the electrodes 43, the motors 41 and the lamps 25 are provided from an electronic circuit module 45 and from driver circuits 37, 49 and 51 respectively. From the TV camera 33 an electric line is arranged to a video interface 53 in the electronic circuit module 45, from which a suitable image signal is delivered to an image processing and image analysis unit 35, compare FIG. 6. The various procedural steps are controlled by a control circuit 55, e.g. a suitable micro processor. The control circuit 55 performs the procedural steps mentioned above and thus controls the displacement of the fiber ends in relation to each other by an activation of the motors 41 in suitable displacement directions, provides a signal to the image processing and image analysis unit 35 for starting an analysis of an obtained picture and a determination of the offset, as is observed in the two directions perpendicular to each other. Further, the control circuit 55 controls the activation of the light sources 25 and the time, when a fusion current is to be started by providing electric voltage to the electrodes 43 and the time period during which this high splicing current is to be delivered and also the regulating current for a controlled monitoring of the offset between the exterior surface of the fiber ends by delivering a lower splicing or electrode current.

The flow diagram of FIG. 8 illustrates the different steps, which are to be performed by the control circuit 45 of FIG. 7, for the real time fusion current control procedure for obtaining a stable and repeatable fusion temperature. First a procedure can be performed for splicing two offset fiber ends, thereby defining a current $I_s$, and a constant $y_s$ for the offset regulation step producing the best possible control of the offset regulation procedure. In any case, these constants are assumed to be known or predetermined, stored in some memory for the kind of fibers used.

Then, as illustrated in FIG. 8, in a first step 801 the two light sources 25 are energized and then the fiber ends are aligned in a step 803 to a predetermined lateral offset between the exterior surfaces of the claddings of the fiber ends. During this stage pictures are taken continuously of the region at the fiber ends and these pictures are analyzed. From the result of the analysis suitable control signals are generated which are provided to the positioning motors 41.

When the desired initial offset has been achieved, the light sources are turned off in a step 805 and then the electrodes 43 are provided with a current of a suitably high value suitable for the splicing of the fiber ends in a step 807. This high current is maintained during 0.5 seconds in a step 809 where the ends are also displaced a very small distance against each other in order that the material of the splice will be fusioned together. Then, in a step 811 the current in the arc is changed to a smaller value suitable for the regulation of the offset, the Real Time Control current $I_s$, compare the prior International patent application cited above, and in a next step 813 two warm fibers images are taken at different times in order to determine the quantity $y_m$ according to Equ. (6). The warm fiber images are thus taken without any exterior illumination only using the radiation emitted from the hot fiber splice region.

From the calculated value $y_m$ the compensation current $\Delta I$ is calculated in a step 815 according to Equ. (8) using some suitable constants $c_1$, $c_2$, possibly as determined in some previously made, standard test for the same type of fiber and stored in a memory. Then it is tested in a step 817 whether the actual temperature in the heated fiber region is sufficiently good, that is whether the absolute value of the difference $(y_m-y_s)$ is less than or equal to a small, predetermined threshold value. If this is not true the electric arc current is changed in a step 819 by adding the compensation current $\Delta I$ to the former value $I$ of the current. Then again the step 813 is performed for a new determination and analysis of the temperature by first taking two different warm fiber images for the new current, then calculating a new value of the compensation current $\Delta I$ in the block 815 and finally comparing in the block 817 the deviation of the actual $y_n$-value to the set value $y_s$. If the test in the step 817 instead gives the answer yes, a step 821 is performed where three hot fiber images are taken for an estimation of the loss in the finished splice. The electric arc is then turned off in a block 523 and an analysis of the pictures taken in the step 821 are performed in a block 825 and the loss or attenuation of light waves propagating through the finished splice is estimated, e.g. as indicated in the prior International patent application cited above. In the last block the final compensation current $\Delta I=I-I_s$ is saved in a suitable memory for future use, e.g. in the next performed splice for the same type of fiber.

As has already mentioned this procedure can also be used only for maintaining the temperature constant during the heating. Then $I_s$ is some initial current value and the corresponding temperature or equivalent quantity $y_s$ is determined by first measuring two offset values at distinct times.

I claim:

1. A method for determining a temperature of a heated region, including a temperature of a piece of material placed inside the heated region, comprising the steps of:
   introducing into a heated region a piece of material having a melt temperature adapted to make it melt and/or turn to a viscous liquid state by the heat of the heated region,
   the piece of material having a shape so that when melting or when turning to a liquid state the piece of material is deformed due to surface tension thereof,
   determining a velocity of deformation from a change of the surface of the piece of material, and
   determining from the determined velocity of deformation the temperature of the piece of material and a temperature of the heated region.

2. A method according to claim 1, wherein
   the piece of material comprises two end portions of optical fibers, and the method further comprises the steps of:
   positioning the two end portions with end surfaces of the end portions adjacent to each other and laterally offset,
   the piece of material is introduced into the heated region so that the fiber end portions are positioned for heating,
   measuring the lateral offset of the fiber ends at least at two different times when the end portions are heated by the heat of the heated region, and
   wherein the deformation velocity is determined from the difference between the measured offset values over the length of the time period between the at least two measurements thereof.

3. A device for determining the temperature of a heated region, using
   a piece of material having a melt temperature selected so that the piece of material melts by exposure to the heat of the heated region when the piece of material is introduced in the heated region,
   the piece of material having a shape so that the piece of material will when melting be deformed due to surface tension thereof,
   the device comprising:
   means for measuring a geometrical shape of the piece of material,
   means for determining a velocity of deformation from repeated measurement of the geometrical shape by the measuring means, and
   means for determining from the determined velocity of deformation a temperature of the piece of material and of the heated region.

4. A device according to claim 3, wherein
the piece of material comprises two end portions of optical fibers, and the device comprises retaining and positioning means for retaining the fibers and positioning the two end portions with their end surfaces adjacent to each other and with a lateral offset and so that the heated region is located at the end portions,
wherein the measuring means are arranged to determine values of the lateral offset of the fiber ends at least at two different times when the fiber end portions are located in the heated region, and
the velocity determining means includes means to calculate from these determined offset values and the length of the time period between the at least two measurements thereof the temperature of the end portions and thence the temperature of the heated region.

* * * * *